US009245042B2

(12) United States Patent
Heo et al.

(10) Patent No.: US 9,245,042 B2
(45) Date of Patent: Jan. 26, 2016

(54) METHOD AND APPARATUS FOR SEARCHING AND STORING CONTENTS IN PORTABLE TERMINAL

(75) Inventors: Dong-Kyu Heo, Suwon-si (KR); Suk-In Jung, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 1112 days.

(21) Appl. No.: 12/807,678

(22) Filed: Sep. 10, 2010

(65) Prior Publication Data

US 2011/0060520 A1 Mar. 10, 2011

(30) Foreign Application Priority Data

Sep. 10, 2009 (KR) ........................ 10-2009-0085251

(51) Int. Cl.
*G06F 17/30* (2006.01)
*G01C 21/00* (2006.01)
*G01C 21/36* (2006.01)

(52) U.S. Cl.
CPC ........ *G06F 17/3087* (2013.01); *G01C 21/3682* (2013.01)

(58) Field of Classification Search
CPC ................ G06F 17/3087; G01C 21/3682
USPC .......... 701/532; 707/769, E17.014, E17.026, 707/E17.143; 455/457, 556.1, 456.3; 705/7.34
See application file for complete search history.

(56) References Cited

U.S. PATENT DOCUMENTS

| 7,071,842 | B1* | 7/2006 | Brady, Jr. ........................ 340/988 |
| 2007/0063050 | A1* | 3/2007 | Attia et al. ............... 235/462.46 |
| 2008/0147730 | A1* | 6/2008 | Lee et al. ..................... 707/104.1 |
| 2008/0268876 | A1* | 10/2008 | Gelfand et al. ............... 455/457 |
| 2009/0094289 | A1* | 4/2009 | Xiong et al. .................... 707/200 |
| 2009/0138439 | A1* | 5/2009 | Yeung et al. ....................... 707/3 |
| 2009/0150349 | A1* | 6/2009 | Cartin et al. ...................... 707/3 |
| 2009/0187466 | A1* | 7/2009 | Carter et al. .................... 705/10 |
| 2010/0190513 | A1* | 7/2010 | Andreasson ............... 455/456.3 |

FOREIGN PATENT DOCUMENTS

| JP | 2004007503 A | | 1/2004 | |
| JP | 2005115684 | * | 4/2005 | .............. G06F 17/30 |
| KR | 20030079472 A | | 10/2003 | |
| KR | 10-2005-0095739 A | | 9/2005 | |
| KR | 20070089337 A | | 8/2007 | |
| KR | 10-2009-0032837 A | | 4/2009 | |

OTHER PUBLICATIONS

Korean Office Action dated Jul. 14, 2015 in connection with Korean Application 10-2009-0085251; 14 pages.

* cited by examiner

*Primary Examiner* — Marthe Marc-Coleman

(57) ABSTRACT

A method and apparatus uses various location information to store and search contents in a portable terminal. The method of storing and searching contents includes obtaining location-based information including at least one of region information and a Point Of Interest (POI) corresponding to current location information when storing the contents. The contents and the location-based information are stored by mapping the contents and the location-based information. At least one of the POI and the region information determined by a user is set when searching the contents. And the contents corresponding to the information determined by the user are searched.

18 Claims, 7 Drawing Sheets

CONTENTS

| WEATHER INFORMATION | TIME INFORMATION | LOCATION INFORMATION | CONTENTS TYPE | CONTENTS INFORMATION | POI INDEX | REGION INFORMATION INDEX | ADDITIONAL INFORMATION |
|---|---|---|---|---|---|---|---|
| 300 | 302 | 304 | 306 | 308 | 310 | 312 | 314 |

FIG.3A

POI

| INDEX | LOCATION INFORMATION | POI CATEGORY | POI NAME | DESCRIPTION |
|---|---|---|---|---|
| 320 | 322 | 324 | 326 | 328 |

FIG.3B

REGION INFORMATION

| INDEX | LOCATION INFORMATION | SMALL-SCALE CLASSIFICATION REGION NAME | MEDIUM-SCALE CLASSIFICATION REGION NAME | LARGE-SCALE CLASSIFICATION REGION NAME |
|---|---|---|---|---|
| 340 | 342 | 344 | 346 | 348 |

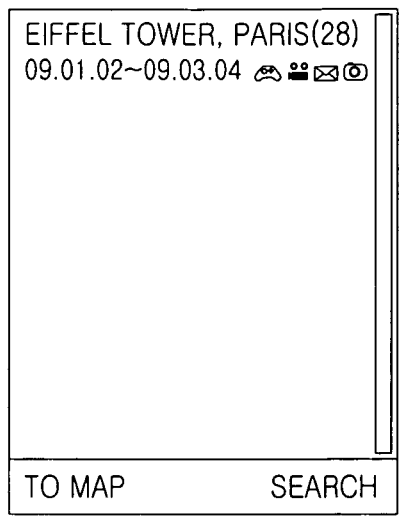
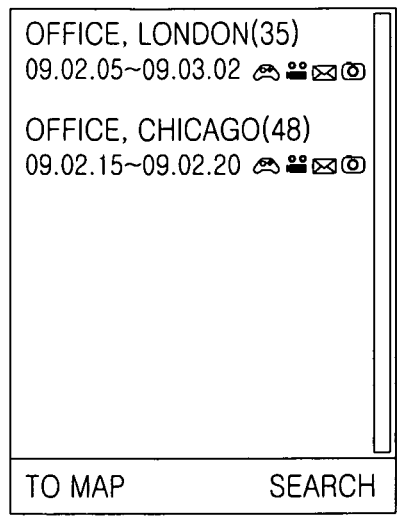
FIG.7A
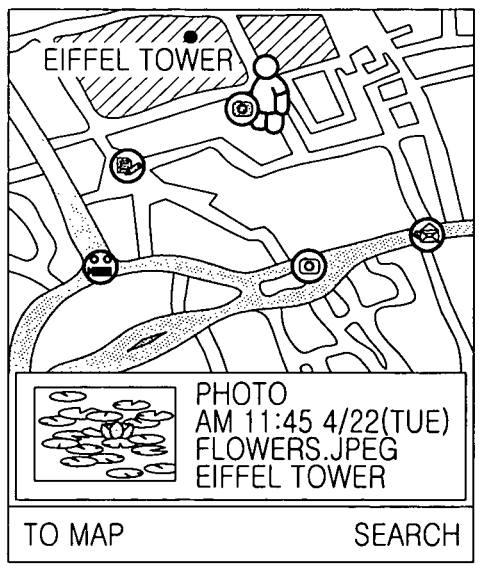
FIG.7B
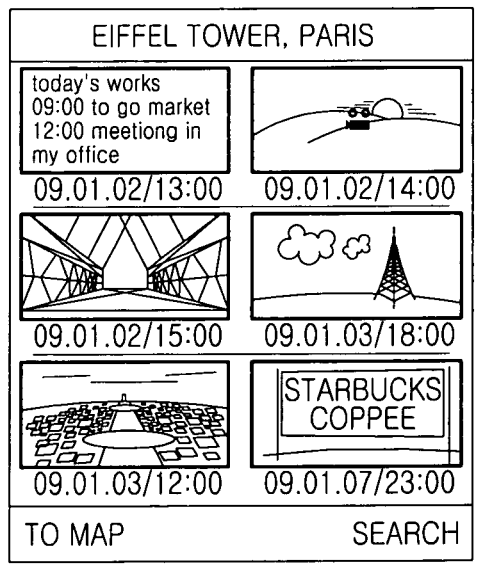
FIG.7C

METHOD AND APPARATUS FOR SEARCHING AND STORING CONTENTS IN PORTABLE TERMINAL

CROSS-REFERENCE TO RELATED APPLICATION(S) AND CLAIM OF PRIORITY

This present application is related to and claims the benefit of priority under 35 U.S.C. §119(a) of a Korean patent application filed in the Korean Intellectual Property Office on Sep. 10, 2009 and assigned Serial No. 10-2009-0085251, the entire disclosure of which is hereby incorporated by reference.

TECHNICAL FIELD OF THE INVENTION

The present invention relates to a method and apparatus for searching and storing contents in a portable terminal. More specifically, the present invention relates to a method and apparatus for searching and storing contents by using location information.

BACKGROUND OF THE INVENTION

Recently, services that share User Created Contents (UCC) created directly by a user through a Web interface have attracted customers' attention. As a result, several methods are developed and provided to more effectively create and manage the UCC. For example, a method of tagging location information to the UCC has conventionally been provided.

In one of methods of tagging the location information to the UCC, a portable terminal obtains latitude and longitude values by using a Global Positioning System (GPS) receiver when creating content, and then stores the obtained values by mapping them to the content. However, the method of tagging the latitude and longitude values to the content has a problem in that it is difficult for the user to intuitively recognize locations by using the latitude and longitude values.

In addition, as illustrated in FIG. 1, a tagging technique using location information of content has conventionally been used. That is, in the tagging technique of FIG. 1, when an image 101 is loaded in a Personal Computer (PC), a tagging information list 103 related to an image creation date, a location, weather condition, and such, is output, and a user performs tagging on the basis of the tagging information list. However, such a technique has a disadvantage in that tagging information can be confirmed only when a specific photo is selected in the PC.

Meanwhile, a method of tagging a Point Of Interest (POI) to the UCC has recently been proposed. The method of tagging the POI to the UCC is a method in which a name of a specific area or a name of a landmark is tagged to the content such that the user can easily know the area or landmark related to the content. For example, there is a conventional method in which a representative area name of a location where a photo is taken is extracted and the area name is set to a file name of the photo. Although the photo can be confirmed by a name of a specific POI in this method, an extended search service cannot be provided.

As described above, since the conventional method simply records only location information, an additional service using the location information is not provided.

SUMMARY OF THE INVENTION

An aspect of the present invention is to solve at least the above-mentioned problems and/or disadvantages and to provide at least the advantages described below. Accordingly, an aspect of the present invention is to provide a method and apparatus for searching and storing contents in a portable terminal.

Another aspect of the present invention is to provide a method and apparatus for storing contents by using location information in a portable terminal.

Another aspect of the present invention is to provide a method and apparatus for searching contents by using location information in a portable terminal.

Another aspect of the present invention is to provide a method and apparatus for configuring and managing location-based database that indicates location information in association with creation of contents in a portable terminal.

In accordance with an aspect of the present invention, a method of storing and searching contents in a portable terminal is provided. The method includes obtaining location-based information including at least one of region information and a Point Of Interest (POI) corresponding to current location information when storing the contents. The contents and the location-based information are stored by mapping the contents and the location-based information. At least one of the POI and the region information determined by a user are set when searching the contents. And the contents corresponding to the information determined by the user are searched.

In accordance with another aspect of the present invention, an apparatus for storing and searching contents in a portable terminal is provided. The apparatus includes a storage unit for storing the contents and location-based information by mapping the contents and the location-based information. A controller obtains location-based information including at least one of region information and POI corresponding to current location information when storing the contents, and searches contents corresponding to at least one of the POI and the region information determined by a user when searching the contents.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A to FIG. 3C illustrate a location-based database in a portable terminal according to an embodiment of the present invention;

FIG. 6A and FIG. 6B illustrate a contents search screen using location information in a portable terminal according to an embodiment of the present invention; and FIG. 7A to FIG. 7C illustrate a contents search result screen using location information in a portable terminal according to an embodiment of the present invention.

DETAILED DESCRIPTION OF THE INVENTION

FIGS. 2 through 7C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminals.

The present invention described below relates to a method and apparatus for storing contents by using location information and for searching contents based on the stored location information in a portable terminal. The contents conceptually include all contents (e.g., a memo, a photo, a video, a Short Message Service (SMS), a Multimedia Message Service (MMS), a call log, and such) that can be created in the portable terminal.

Figure 1:
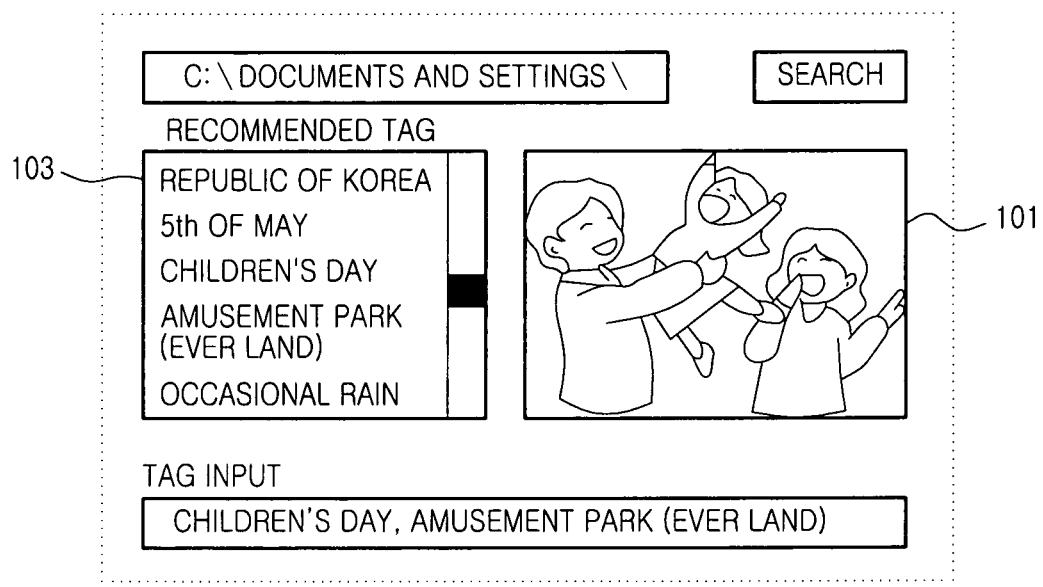
FIG. 1 illustrates a conventional tagging interface using location information in a Personal Computer (PC)
Figure 2:
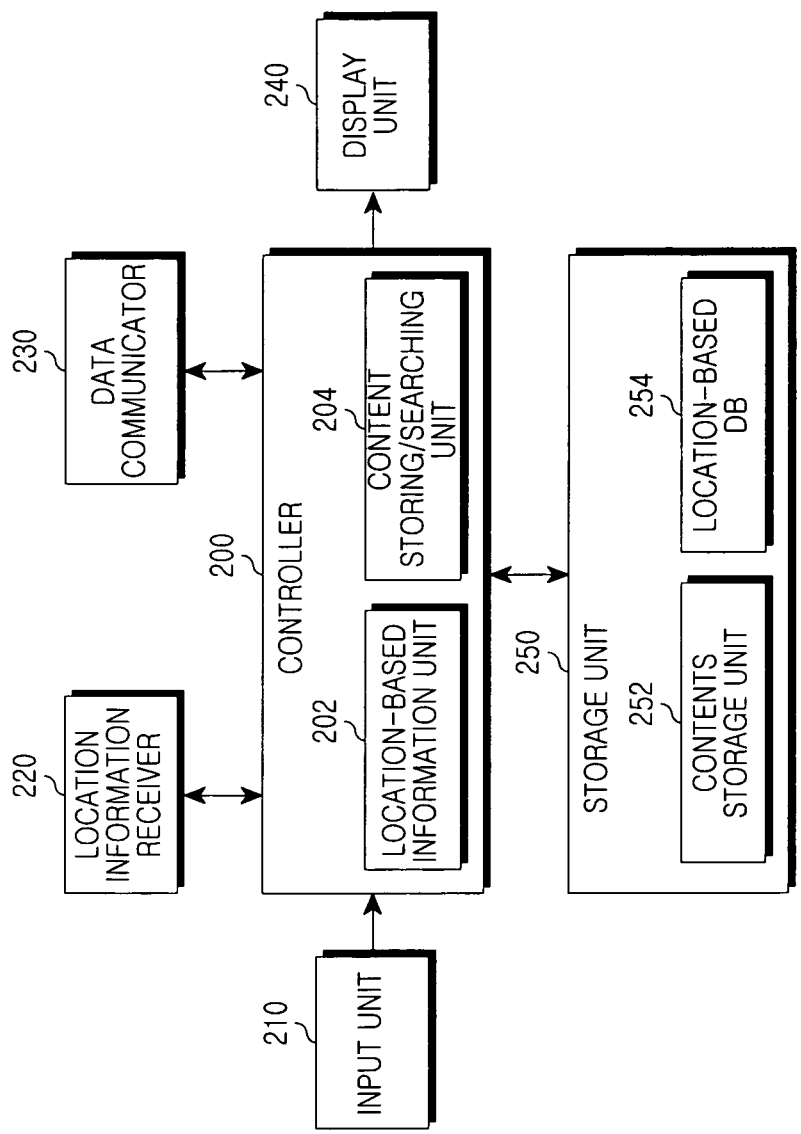
FIG. 2 illustrates a portable terminal according to an embodiment of the present invention.

FIG. 2 illustrates a portable terminal according to an embodiment of the present invention.

Referring to FIG. 2, the portable terminal includes a controller 200, an input unit 210, a location information receiver 220, a data communicator 230, a display unit 240, and a storage unit 250. The controller 200 includes a location-based information unit 202 and a content storing/searching unit 204. The storage unit 250 includes a contents storage unit 252 and a location-based DataBase (DB) 254.

The controller 200 controls and processes the overall operation of the portable terminal. In particular, according to the present invention, the controller 200 includes the location-based information unit 202 and the content storing/searching unit 204 to control and process a function of obtaining region information and a Point Of Interest (POI) corresponding to location information of the terminal and storing the obtained POI and region information by mapping them to the contents. The POI indicates a specific region name or a landmark name, for example, a tourist attraction, a general geographical feature of a surrounding area, a building name, and such.

That is, at the occurrence of a contents storage event, the controller 200 receives location information for indicating a current location of the portable terminal, i.e., a location coordinate, from the location information receiver 220, and obtains region information and a POI corresponding to the location coordinate by using the location-based information unit 202. The location-based information unit 202 can obtain the POI corresponding to the location coordinate by searching the location-based DB 254 to find a POI DB and can obtain region information corresponding to the location coordinate by searching the location-based DB 254 to find a region information DB. The location-based DB 254 is a DB for representing information related to the contents location and, as illustrated in FIG. 3A to FIG. 3C, can include a contents DB, a POI DB, and a region information DB.

In addition, the controller 200 obtains additional information corresponding to the location coordinate and detailed information related to the content by using the location-based information unit 202. The additional information is information such as weather information, regional specialty information, event information, and such, of a region corresponding to the location information, and can be obtained through network access or through information pre-stored in the portable terminal. Further, the detailed information related to the content implies information on a content creation date, a content creation time, a content size, and a content storage address.

The controller 200 controls and processes a function of storing the contents created by the content storing/searching unit 204 and information obtained by the location-based information unit 202 by mapping the contents and the information. The content storing/searching unit 204 stores the created contents in the contents storage unit 252, and stores the obtained information in the location-based DB 254. In order to indicate contents corresponding to the obtained information, the contents DB also stores information of a location for storing the contents.

In addition, when a content search event is generated by a user, the controller 200 controls the display unit 240 to display a window for searching contents by using region information or a POI by the use of the content storing/searching unit 204. Thereafter, when a specific POI or region information is input through the input unit 210, the controller 200 controls and processes a function for searching a contents DB of the location-based DB 254 to find records corresponding to the POI or region information by the use of the content storing/searching unit 204, for searching the contents storage unit 252 to find corresponding contents on the basis of contents storage address information included in the found records, and for displaying the search result to the display unit 240.

The input unit 210 includes a plurality of function keys and alphanumeric keys and provides the controller 200 with input data corresponding to a key pressed by the user or a user's touch. According to the present invention, the input unit 210 receives a POI or region information for contents search from the user, and provides the received POI or region information to the controller 200.

The location information receiver 220 obtains location information for representing a location of the portable terminal, i.e., a location coordinate, and then provides the obtained information to the controller 200. Herein, the location information can be obtained by using power of the portable terminal, a time difference in radio wave delivery, a radio wave reception angle of an antenna, and a Global Positioning System (GPS).

The data communicator 230 performs a function of processing transmission and reception of a radio signal of data that is input and output through an antenna (not shown). In particular, according to the present invention, the data communication 230 processes transmission and reception of a signal for obtaining additional information (i.e., weather information, regional specialty information, and event information) related to the location information from a network under the control of the controller 200.

Figures 6A, 6B:
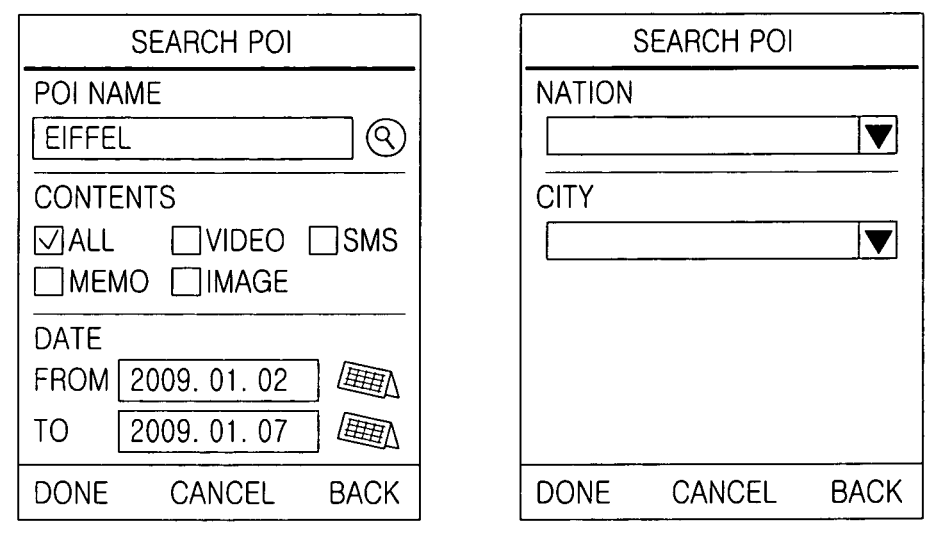

The display unit 240 displays state information of the portable terminal, alphanumeric characters, large-sized moving and still pictures, and such. In particular, the display unit 240 displays a window for searching contents by using the POI or region information under the control of the controller 200, as illustrated in FIG. 6A and FIG. 6B, and displays a list or map for indicating a result obtained by searching the contents as illustrated in FIG. 7A to FIG. 7C.

The storage unit 250 stores data and various programs for the overall operation of the portable terminal. In particular, according to an embodiment of the present invention, the storage unit 250 includes the contents storage unit 252 and the location-based DB 254. The contents storage unit 252 stores the contents under the control of the controller 200. The contents storage unit 252 can store file-based contents in a file according to a file system, and can store DB-based contents in a corresponding DB. The location-based DB 254 is a DB for indicating information related to the location of the contents and, as illustrated in FIG. 3A to FIG. 3C, can consist of a contents DB, a POI DB, and a region information DB. The contents DB includes various information fields obtained by the location-based information unit 202 when storing the contents. That is, as illustrated in FIG. 3A, the contents DB includes a date information field 300, a time information field 302, a location information field 304, a contents type field 306, a contents information field 308, a POI index field 310, a region information index field 312, and an additional information field 314. The contents information field 308 indicates information of an address at which the contents is stored. The POI index field 310 indicates an index of POI corresponding to location information of the contents. The region information index field 312 indicates an index of region information corresponding to location information of the contents in the region information DB. Additionally, as illustrated in FIG. 3B, the POI DB may include an index field 320, a location information field 322, a POI category field 324, a POI name field 326, and a description field 328. The POI category field 324 can represent whether a corresponding POI belongs to a tourist attraction or belongs to a general geographical feature or a landmark of a surrounding area, and can also represent a sub-type (i.e. a restaurant, a gas station, a government office, and such) of the POI. Further, as illustrated in FIG. 3C, the region information DB can include an index field 340, a location information field 342, a small-scale classification region name field 344, a medium-scale classification region name field 346, and a large-scale classification region name field 348. The small-scale classification region name field 344, the medium-scale classification region name field 346, and the large-scale classification region name field 348 can represent a street number, a borough, a city, a country, and so forth.

A record that has the structure of the contents DB can be added whenever contents are stored. The POI DB and the region information DB can be pre-stored, or can be updated under the control of the user. Also, fields constituting each DB can be configured differently according to a design.

Herein, the contents can be stored in the contents storage unit 252, location-based information of the contents can be stored in the location-based DB 254, and contents can be prevented from being redundantly stored by including storage address information of the contents in the location-based information.

Figure 4:
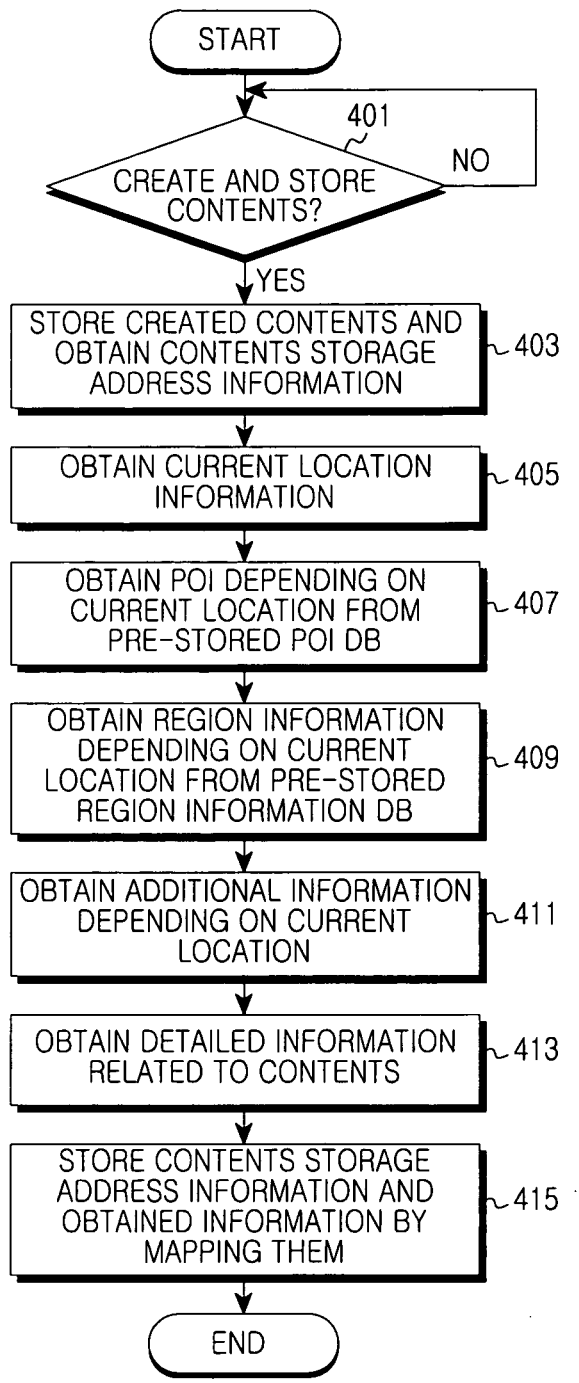
FIG. 4 illustrates a process of storing contents by using location information in a portable terminal according to an embodiment of the present invention.

FIG. 4 illustrates a process of storing contents by using location information in a portable terminal according to an embodiment of the present invention.

Referring to FIG. 4, when the contents are created and stored in block 401, the portable terminal stores the created contents, and obtains link information for storing the contents, i.e., storage address information, in block 403.

In block 405, the portable terminal obtains current location information of the portable terminal, i.e., a location coordinate. In block 407, the portable terminal searches a pre-stored POI DB to find and obtain a POI corresponding to the current location information. In block 409, the portable terminal obtains region information corresponding to the current location information from the pre-stored region information DB. In block 411, the portable terminal obtains additional information depending on the current location. The additional information is information such as weather information, regional specialty information, event information, and such, of a region corresponding to the location coordinate and can be obtained through network access or can be obtained through information pre-stored in the portable terminal. In block 413, the portable terminal obtains detailed information related to the content. Herein, the detailed information related to the content implies a contents creation date, a contents creation time, a contents type, a contents size, and contents storage address information.

In block 415, the portable terminal maps the contents storage address information and the obtained information, i.e., the location-based information, and stores the result to the location-based DB 254. Thereafter, the procedure of FIG. 4 ends.

In the aforementioned description, operations of blocks 403 to 413 can be performed in difference sequences or simultaneously according to a design.

Figure 5:
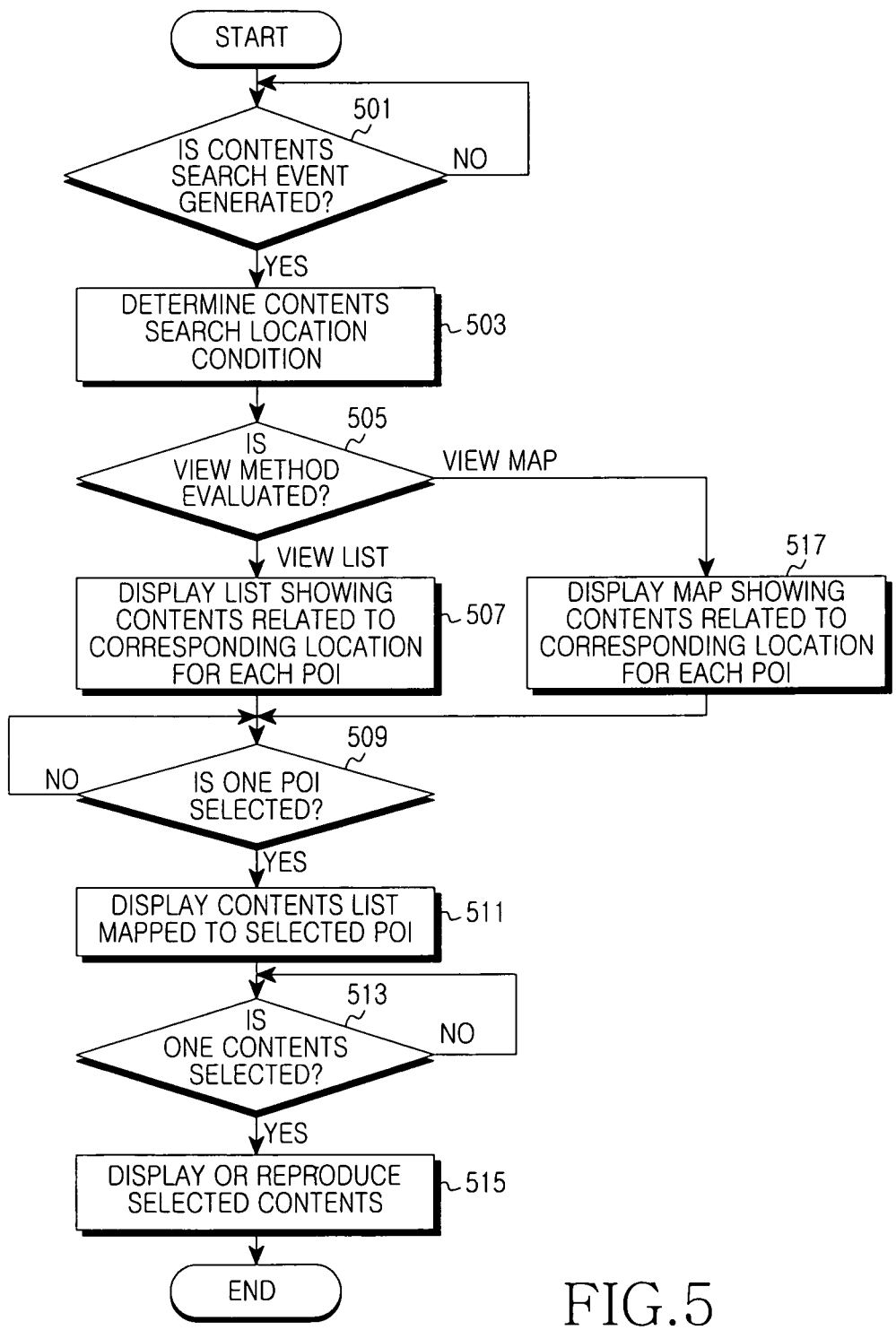
FIG. 5 illustrates a process of searching contents by using location information in a portable terminal according to an embodiment of the present invention.

FIG. 5 illustrates a process of searching contents by using location information in a portable terminal according to an embodiment of the present invention.

Referring to FIG. 5, when a contents search event occurs in block 501, proceeding to block 503, the portable terminal displays a window for receiving an input of a contents search location condition such that the contents search location condition is determined by a user. For example, as illustrated in FIG. 6A and FIG. 6B, the portable terminal displays a search window capable of searching contents by entering a POI name or a region name. The portable terminal allows a contents type, a contents creation date, and such, to be configurable through the search window and allows the user to configure only one or more search location conditions.

Thereafter, in block 505, the portable terminal evaluates whether a view method by which the user can view the found contents is determined. That is, the portable terminal evaluates whether the view method is a list view method for displaying the found contents in a list form or a map view method for displaying the found contents in a map form. The view method may use a default view method of the portable terminal instead of being additionally determined by the user, and when the user intends to change the view method, it may be changed to another view method.

If the list view method is determined as the view method, the portable terminal searches contents corresponding to the configured search location condition and displays a list containing the found contents in block 507. Each of the contents included in the list can be classified by a POI name or a region name. For example, as illustrated in FIG. 7A, when a POI name of 'Eiffel Tower' is determined as the search location condition, the portable terminal can display that twenty-eight ('28') contents that have the POI name of 'Eiffel Tower' are present, and when a POI name of 'Office' is determined as the search location condition, the portable terminal can display that the number of contents that have the POI name of 'Office' is thirty-five ('35') and forty-eight ('48'), respectively, in London and Chicago. The portable terminal can present a contents creation date and a contents type in the list in an icon form. The portable terminal can change the view method to the map view method when the user intends to change the view method.

Alternatively, when the map view method is determined as the view method, the portable terminal searches contents corresponding to the determined search location condition and displays a map including the found contents in block 517. Each of the contents included in the map can be classified by a POI name or a region name. For example, as illustrated in FIG. 7B, when a POI name of 'Eiffel Tower' is determined as the search location condition, the portable terminal displays a map for showing a location of 'Eiffel Tower', and displays contents that have the POI name of 'Eiffel Tower' on the map. The portable terminal can present a contents creation date and a contents type in an icon form to the map and can display a location of the portable terminal and a location of a registered peer terminal to the map. The portable terminal may change the view method to the list view method when the user intends to change the view method.

In block 509, the portable terminal evaluates whether one POI is selected from POIs displayed using the list view method or the map view method.

When one POI is selected, the portable terminal displays a list including contents corresponding to the selected POI in block 511. For example, when a POI of 'Eiffel Tower' is selected, as illustrated in FIG. 7C, the portable terminal displays contents that have the POI name of 'Eiffel Tower'. The portable terminal displays the contents in a thumbnail form, and may also display detailed information together.

In block 513, the portable terminal evaluates whether one of contents is selected. If one of contents is selected, the portable terminal displays or reproduces the selected content in block 515. Then, the process of FIG. 5 ends.

According to embodiments of the present invention, when contents are stored in the portable terminal, a representative POI of a corresponding location and region information are assigned to the contents by using location information, and the contents are searched by using the POI and the region information. Therefore, the POI and region information for mutually exclusive several types of contents can be collectively stored and managed, and an effective and intuitive contents search service can be provided by using the POI and the region information.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method provided by a portable terminal to store and search contents in the portable terminal, the method comprising:
   obtaining a current location of the portable terminal;
   obtaining location-based information comprising at least one of region information or a Point Of Interest (POI) that corresponds to the location of the portable terminal;
   mapping the contents to the location-based information;
   storing the location-based information together with the contents;
   receiving an input of at least one of the POI or the region information; and
   displaying an icon representing a type of the contents mapped to at least one of the POI and the region information on a map including the location of the portable terminal, wherein displaying the icon comprises displaying the icon at a location on the map.

2. The method of claim 1, wherein the region information and the POI are obtained from a pre-stored database that represents at least one of a mapping relation between the location of the portable terminal and the POI or a mapping relation between the location of the portable terminal and the region information.

3. The method of claim 2, wherein the mapping relation between the location of the portable terminal and the POI comprises at least one of an index field, a location information field, a POI category field, a POI name field, or a POI description field.

4. The method of claim 2, wherein the mapping relation between the location of the portable terminal and the region information comprises at least one of an index field, a location information field, or a region name field.

5. The method of claim 1, wherein the location-based information comprises index information for at least one of the region information or the POI that corresponds to the location of the portable terminal.

6. The method of claim 1, wherein storing the location-based information comprises storing address information to indicate a location to store the contents and the location-based information by including the address information in the location-based information.

7. The method of claim 1, wherein the location-based information further comprises at least one of weather information, regional specialty information, or event information with respect to a region that corresponds to the current location of the portable terminal.

8. The method of claim 1, wherein the location-based information further comprises at least one of a contents creation date, a contents creation time, a contents type, a contents size, or contents storage address information.

9. The method of claim 1, further comprising displaying a list comprising the contents.

10. A portable terminal having a display unit, the portable terminal comprising:
    a storage unit configured to store contents; and
    a controller configured to:
       obtain a current location of the portable terminal,
       obtain location-based information comprising at least one of region information or a Point Of Interest (POI) that corresponds to the location of the portable terminal,
       map the contents to the location-based information,
       store the location-based information together with the contents in the storage unit,
       receive an input of at least one of the POI or the region information, and
       display an icon representing a type of the contents mapped to at least one of the POI or the region information on a map including the location of the portable terminal, wherein the controller displays the icon at a location on the map.

11. The portable terminal of claim 10, wherein:
    the storage unit is configured to store a database that represents at least one of a mapping relation between the location of the portable terminal and the POI or a mapping relation between the location of the portable terminal and the region information, and
    the controller is configured to obtain at least one of the region information or the POI from the storage unit.

12. The portable terminal of claim 11, wherein the mapping relation between the location of the portable terminal and the POI comprises at least one of an index field, a location information field, a POI category field, a POI name field, or a POI description field.

13. The portable terminal of claim 11, wherein the mapping relation between the location of the portable terminal and the region information comprises at least one of an index field, a location information field, or a region name field.

14. The portable terminal of claim 10, wherein the location-based information comprises index information for at least one of the region information or the POI that corresponds to the location of the portable terminal.

15. The portable terminal of claim 10, wherein the storage unit is configured to store address information that indicates a location to store the contents and the location-based information by including the address information in the location-based information.

16. The portable terminal of claim 10, wherein the location-based information further comprises at least one of weather information, regional specialty information, or event information with respect to a region that corresponds to the location of the portable terminal.

17. The portable terminal of claim 10, wherein the location-based information further comprises at least one of a contents creation date, a contents creation time, a contents type, a contents size, or contents storage address information.

18. The portable terminal of claim 10, wherein the controller is configured to display a list comprising the contents.

* * * * *